(12) United States Patent
Hirayama et al.

(10) Patent No.: US 8,696,500 B2
(45) Date of Patent: Apr. 15, 2014

(54) TENSIONER LEVER

(75) Inventors: Manabu Hirayama, Osaka (JP); Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 1142 days.

(21) Appl. No.: 12/127,199

(22) Filed: May 27, 2008

(65) Prior Publication Data
US 2009/0036241 A1 Feb. 5, 2009

(30) Foreign Application Priority Data
Jul. 31, 2007 (JP) .................................. 2007-200136

(51) Int. Cl.
*F16H 7/08* (2006.01)
(52) U.S. Cl.
USPC ............. 474/111; 474/91; 184/11.5; 184/6.5; 184/15.1
(58) Field of Classification Search
USPC .................................................. 474/111, 91
See application file for complete search history.

(56) References Cited

U.S. PATENT DOCUMENTS

| | | | | |
|---|---|---|---|---|
| 4,987,974 A | * | 1/1991 | Crouch | 184/6.12 |
| 5,647,811 A | * | 7/1997 | Mott | 474/91 |
| 5,720,682 A | * | 2/1998 | Tada | 474/91 |
| 5,868,638 A | * | 2/1999 | Inoue et al. | 474/110 |
| 6,849,013 B2 | * | 2/2005 | Konno et al. | 474/111 |
| 6,849,014 B2 | * | 2/2005 | Horie et al. | 474/111 |
| 7,137,916 B2 | * | 11/2006 | Kurohata et al. | 474/111 |
| 2003/0064842 A1 | | 4/2003 | Konno | |
| 2003/0064843 A1 | * | 4/2003 | Konno | 474/111 |
| 2009/0325748 A1 | * | 12/2009 | Pflug et al. | 474/91 |

FOREIGN PATENT DOCUMENTS

| | | |
|---|---|---|
| GB | 2 351 136 A | 12/2000 |
| JP | 2000-356252 | 12/2000 |
| JP | 2004-116681 | 4/2004 |

* cited by examiner

*Primary Examiner* — Thomas Irvin
(74) *Attorney, Agent, or Firm* — Howson & Howson LLP

(57) ABSTRACT

In a pivoted tensioner lever extending upward from a pivot axis, both ends of boss through which a pivot shaft extends are provided with funnel-shaped grooves that guide oil adhering to the lever body into a region between the shaft and the inside of the boss. Oil guiding walls, continuous with the boss, and downwardly sloping reinforcing ribs with oil passages formed at their lower ends, increase flow of oil adhering to the lever body to the region between the shaft and the inside of the boss.

12 Claims, 8 Drawing Sheets

TENSIONER LEVER

CROSS-REFERENCE TO RELATED APPLICATION

This application claims priority on the basis of Japanese patent application 2007-200136, filed Jul. 31, 2007. The disclosure of Japanese application 2007-200136 is hereby incorporated by reference.

FIELD OF THE INVENTION

This invention relates to a tensioner lever, for use in a chain transmission in an automobile engine or the like. The chain transmission transmits power from a driving sprocket to a driven sprocket, and the tensioner lever cooperates with a tensioner to maintain appropriate tension in the chain. The invention relates more specifically to a pivoted tensioner lever which extends upward from its pivot axis.

BACKGROUND OF THE INVENTION

Pivoted tensioner levers have been widely used for maintaining tension in transmission chains used as timing chains in internal combustion engines. These levers have shoes that are in sliding contact with a portion of the transmission chain, and are typically pivoted on shoulder bolts secured to the engine block.

As shown in FIG. 6, for example, a typical conventional tensioner lever 500 comprises a shoe 510, in sliding contact with a chain C traveling along the longitudinal direction of the lever. The back side of the shoe is engaged with, and supported by, an elongated lever body 520, having a boss 530 adjacent its proximal end, i.e., the end that is first contacted by the traveling chain as the chain approaches the lever. As shown in FIGS. 7 and 8, the lever is mounted on an inner wall of an engine E by means of a shoulder bolt SB, having a cylindrical part Sr that extends through a cylindrical hole in the boss 530. For further details of the typical conventional tensioner lever, reference may be made to British patent application 2 351 136, published Dec. 20, 2000.

When the lever is mounted on the shoulder bolt, a part of the outer circumferential surface of the cylindrical part Sr of the shoulder bolt is exposed. The tensioner lever can be mounted so that it extends upward from the location of the shoulder bolt on which it is pivoted. Therefore, engine oil 0 (FIG. 6) adhering to the lever body 510 can flow into the narrow region between the outer circumferential surface of the cylindrical part Sr of the bolt, and the inner surface of the cylindrical hole in the boss 530. However, when the boss 530 of the conventional tensioner lever is in contact with an inner wall of an engine E as shown in FIG. 7, or in contact with the flange Sf of a shoulder bolt SB, as shown in FIG. 8, oil can flow into the space between the bolt and the inner surface of the boss from only one end of the boss, and there is insufficient room for oil to flow into this space from the opposite end of the boss. As a result, galling, seizing, and asymmetric, i.e., one-sided, wear of the mounting bolt and the interior of the boss, can occur due to insufficient lubrication, and early failure of the tensioner lever can occur. Furthermore, friction between the boss 530 and the outer circumferential surface of the cylindrical portion Sr of the bolt SB, can prevent the tensioner lever from reliably following and responding to changes in tension in the transmission chain C.

SUMMARY OF THE INVENTION

An object of this invention, therefore, is to solve the above-mentioned problems, and to provide a tensioner lever which suppresses galling, seizing, asymmetric wear, and friction loss in a pivoted tensioner lever. These objects are addressed by utilizing engine oil more efficiently to lubricate the tensioner lever.

In accordance with the invention, in an engine having a traveling transmission chain, tension is maintained in the chain by a pivoted tensioner lever. The lever comprises an elongated lever body having front and back sides, and two opposite lateral sides, and an elongated shoe having a back side supported by the front side of the lever body and a front surface for sliding contact with the chain. The chain is arranged to travel along the direction of elongation of the shoe from a first end thereof toward an opposite end thereof. A boss is formed on the lever body adjacent the first end of the shoe. The boss has a through hole for receiving the shaft portion of a shoulder bolt mounted on the engine. The shaft portion of the shoulder bolt extends through the boss of the lever body, and an oil guiding groove extends from the outer circumferential surface to the inner circumferential surface of the boss, for guiding engine oil adhering to the lever body to a region between the shaft portion of the shoulder bolt and the inner surface of the through hole.

In a preferred embodiment, the boss formed on the lever body has two oil guiding grooves. The boss has a first portion extending from one lateral side of the lever body, the oil-guiding groove being formed in the first portion, and a second portion extending from the other lateral side of the lever body, and having a second oil guiding groove formed in the second portion and extending through the second portion from the outer circumferential surface to the inner circumferential surface of the boss, for guiding engine oil adhering to the lever body to a region between the shaft portion of the shoulder bolt and a portion of the inner surface of the through hole.

Each oil guiding groove preferably has a tapered funnel shape, the groove being wider at the outer circumferential surface of the boss and narrower at the inner circumferential surface of the boss.

Desirably, in accordance with another aspect of the invention, the lever body is formed with an oil guiding wall, continuous with the outer circumferential surface of the boss, and extending from the location of the oil guiding groove, for carrying engine oil adhering to the lever body into the oil guide groove.

In accordance with still another aspect of the invention, the lever body has at least one integrally molded reinforcing rib having an opening forming an oil communicating path allowing engine oil adhering to the lever body to flow past the reinforcing rib toward the boss. Preferably, the reinforcing rib is disposed obliquely in a direction such that engine oil adhering to the rib flows downward by gravity toward the oil communicating path.

In accordance with the invention, since an oil guiding groove extends from the outer circumferential surface to the inner circumferential surface of the boss of the tensioner lever, engine oil adhering to the lever body is guided reliably to the region between the shaft portion of the shoulder bolt and the inner surface of the through hole. Thus, the engine oil can be more effectively utilized for lubricating the pivoting tensioner lever, and galling, seizing, asymmetric wear, and friction loss are suppressed, and the durability of the lever and its mounting bolt are improved.

When both of the oppositely extending parts of the boss are provided with oil guiding grooves, even when the boss is brought into contact with a wall of the engine or with a flange of the shoulder bolt, engine oil is reliably guided from both ends of the boss into the region between the shaft portion of the bolt and the inner surface of the hole in the boss, so that uneven distribution of the oil is prevented, and more effective avoidance of galling, seizing, one-sided wear, and friction loss can be achieved.

When the oil guiding groove is formed with a funnel shape, tapering from the circumferential surface of the boss toward the inner circumferential surface, even when only a mist of engine oil is present, the mist is reliably caught, collected, and liquefied, and the liquefied oil flows reliably to the region between the outer circumferential surface of the lever mounting bolt and the inner surface of the boss. The tapered oil guiding groove also more effectively collects small amounts of oil adhering to the lever.

When the lever body is formed with an oil guiding wall, continuous with the outer circumferential surface of the boss, and extending from the location of the oil guiding groove, engine oil adhering to the lever body flows more smoothly and efficiently into the oil guide groove.

When the lever body has at least one integrally molded reinforcing rib having an opening forming an oil communicating path allowing engine oil adhering to the lever body to flow past the reinforcing rib toward the boss, engine oil adhering to the entire surface of the lever body can flow smoothly toward the pivoting boss without interference by the reinforcing rib, and, as a result, more oil can be supplied to the region between the shaft portion of the bolt and the inner surface of the hole in the boss for improved lubrication.

Still further improvements in lubrication effectiveness can be realized when the reinforcing rib is disposed obliquely in a direction such that engine oil adhering to the rib flows downward by gravity toward the oil communicating path

DETAILED DESCRIPTION OF THE PREFERRED EMBODIMENTS

The tensioner lever in accordance with the invention is characterized by an oil guiding groove, extending from the outer circumferential surface to the inner circumferential surface of the lever-mounting boss, for guiding engine oil adhering to the lever body to the region between the shaft portion of a shoulder bolt on which the lever is pivotally mounted and the inner surface of the through hole in the mounting boss. The groove provides for more effective utilization of engine oil in lubricating the lever. Galling, seizing, asymmetric wear, and friction loss are suppressed, improved endurance is exhibited, and the lever maintains proper tension in a transmission chain by smoothly following changes in chain tension in cooperation with a tensioner.

The lever of the invention can be embodied in various forms. For example, the lever can comprise a shoe and a lever body composed of different materials, e.g., a synthetic resin and metal, respectively. Alternatively, the lever can be molded as a unit from a single material such as synthetic resin, in which case, an assembly step, in which the shoe is connected to the lever body, is unnecessary.

The tensioner lever of the invention can be arranged to maintain tension in an engine timing chain used to drive one or more camshafts from an engine crankshaft. Alternatively the lever can be used to maintain tension in transmission chain which drives an auxiliary mechanism such as an oil pump or the like.

Figure 1:
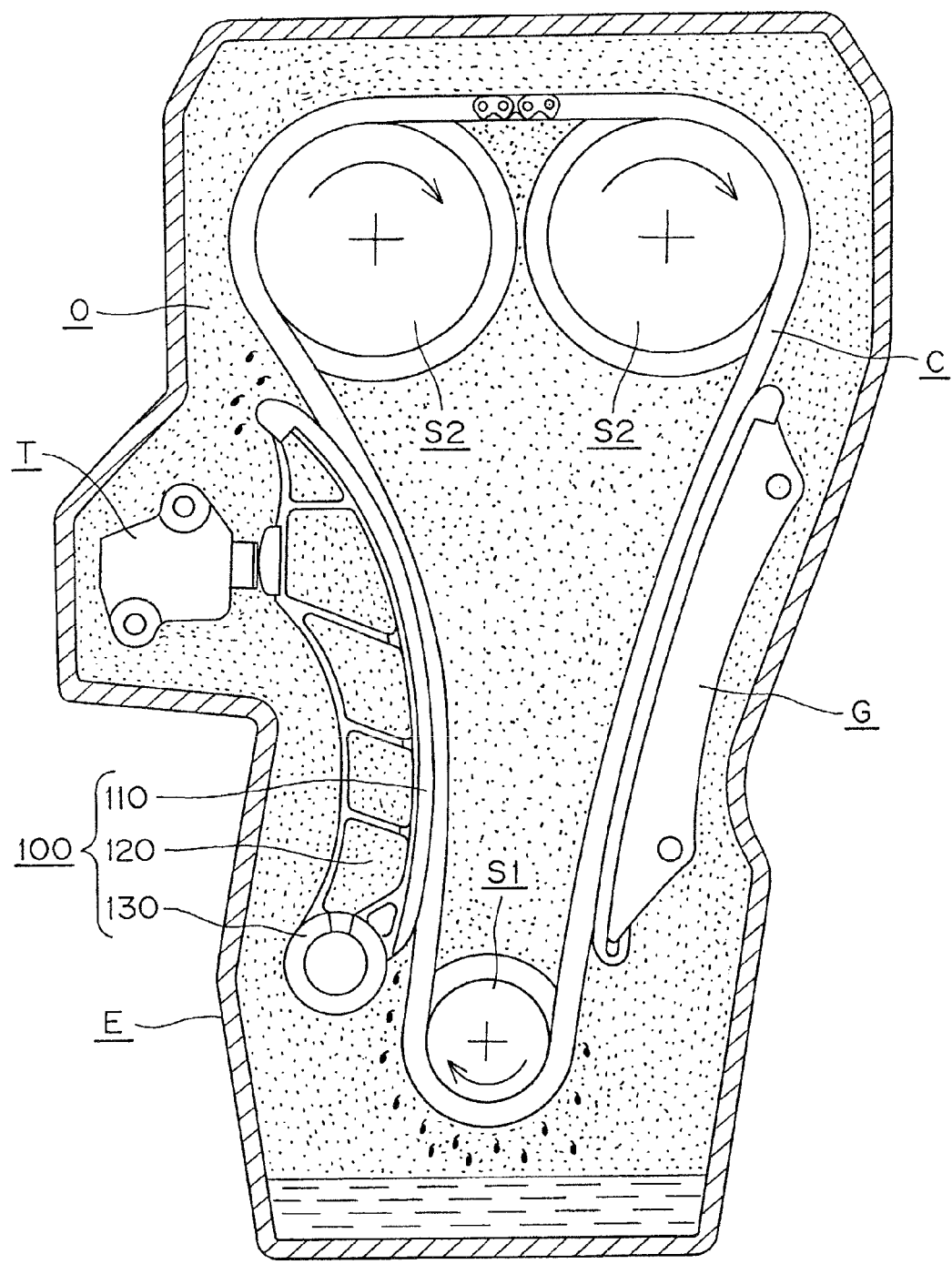
FIG. 1 is an elevational view of an engine timing transmission incorporating a tensioner lever in accordance with the invention.

As shown in FIG. 1, a tensioner lever 100 abuts a traveling transmission chain C arranged to drive a pair of engine camshaft sprockets S2 from a crankshaft sprocket S1. The lever is pivoted, and urged, by the plunger of a hydraulic tensioner T, into engagement with a portion of the chain C that travels from the crankshaft sprocket toward one of the camshaft sprockets. The direction of rotation of the sprockets is indicated by arrows.

The lever comprises an elongated shoe 110, on a front side of which the transmission chain C slides in the direction of elongation of the shoe. An elongated metal lever body 120 supports the back side of the shoe 110, and includes a boss 130, adjacent the lower end of the lever body. The lever body is pivotally mounted on a shaft which is fixed to the engine E and extends though a hole in the boss. The lever extends upward from the shaft, which is preferably a cylindrical portion of shoulder bolt threaded into the engine block (but not shown in FIG. 1). A fixed guide G abuts and guides the tension side of the transmission chain C.

Figure 2:
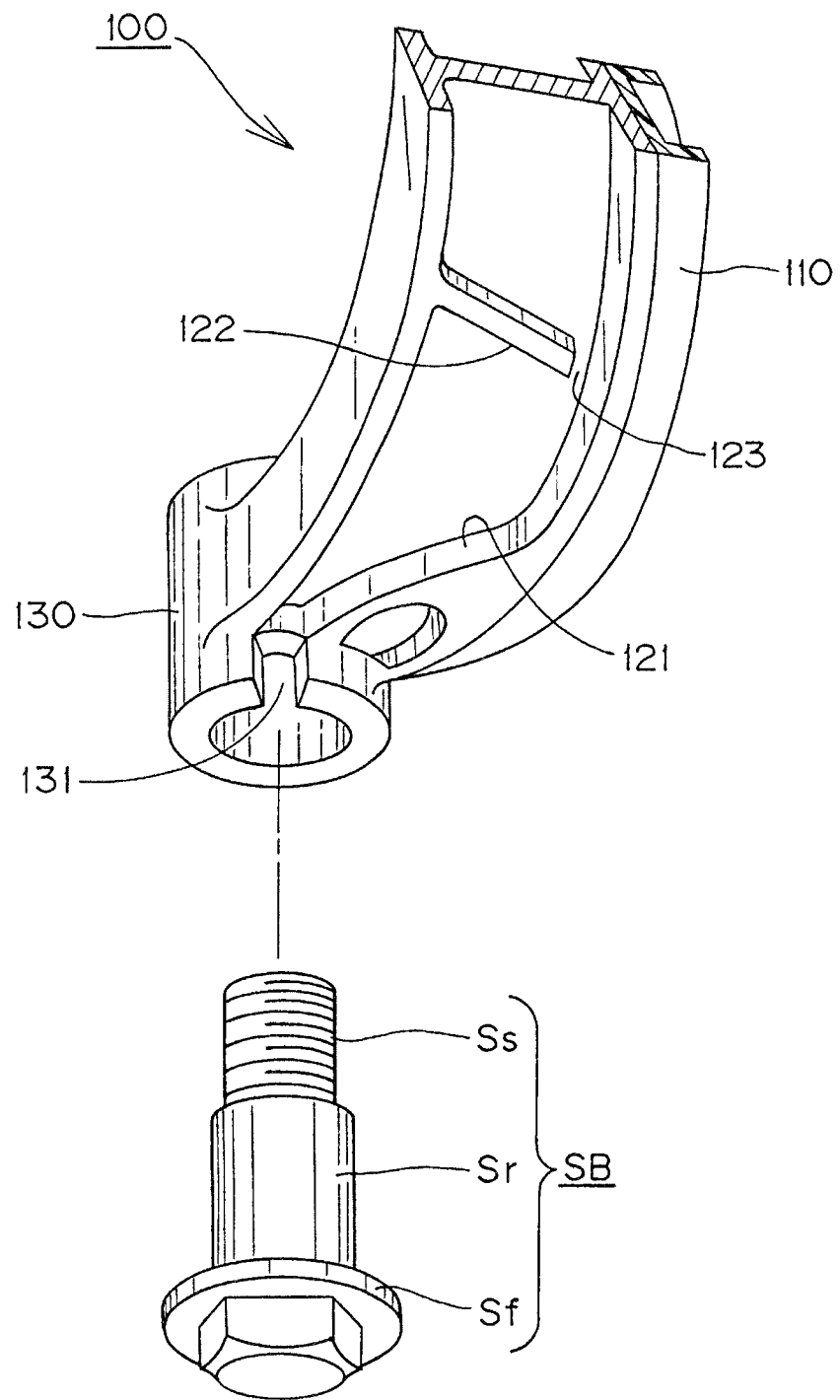
FIG. 2 is an enlarged, exploded perspective view of a portion of the tensioner lever assembly shown in FIG.

The shoulder bolt SB, on which the tensioner lever 100 is pivotally mounted, is shown in FIG. 2. The bolt includes a flange Sf, which limits movement of the boss of the tensioner lever along a the outer circumferential surface of a cylindrical part Sf of the bolt, and a threaded portion Ss, which can be engaged with a suitably threaded hole in the engine block.

Figure 3:
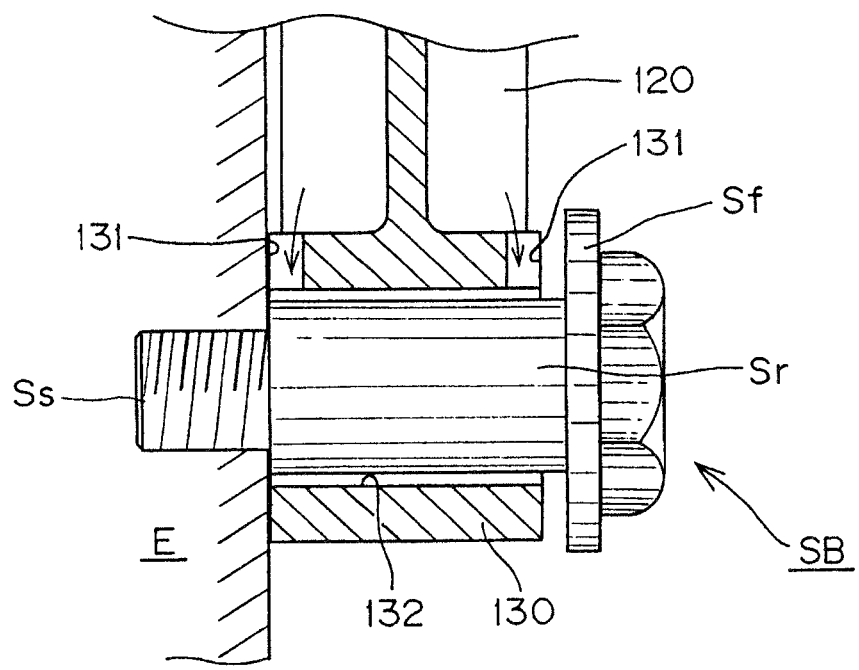
FIG. 3 is a cross-sectional view of a part of the tensioner lever, showing the pivoting boss portion of the lever in direct contact with a wall of an engine.
Figure 4:
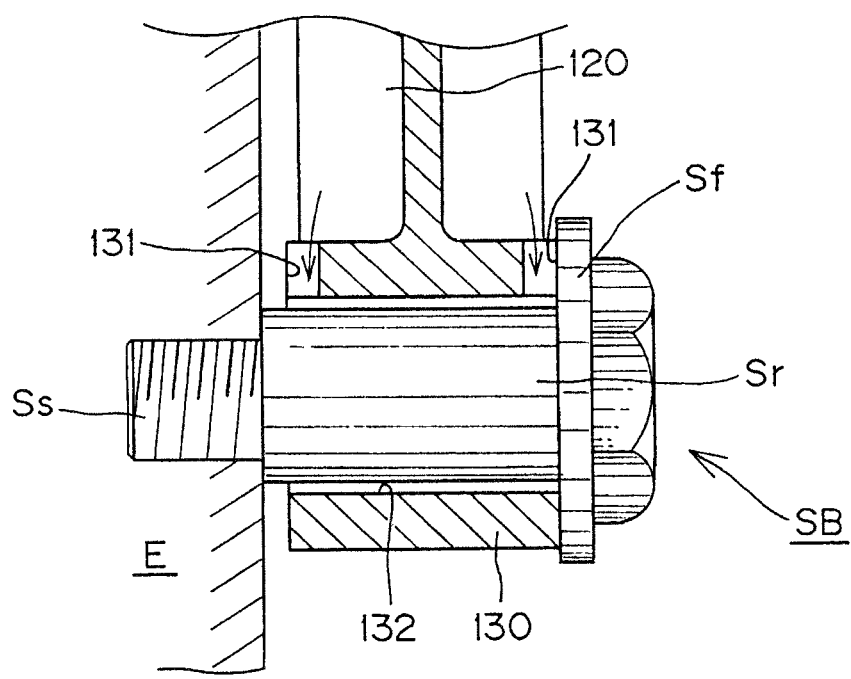
FIG. 4 is a cross-sectional view of a part of the tensioner lever, showing the pivoting boss portion of the lever in direct contact with the flange portion of a shoulder bolt on which the lever is pivoted.

As shown in FIGS. 3 and 4, the boss 130 extends laterally in both directions from a central web of the lever body, and oil guide grooves 131 are provided adjacent both ends of the boss 130. The grooves can be in the form of holes extending though the boss and spaced from its ends. Preferably, however, the grooves 131 are formed by cutting out parts of the boss at the ends thereof. These grooves 131 extend from the outer circumferential surface of the boss to its inner circumferential surface, thereby providing flow paths for passage of oil adhering to the lever body to the region 132 between the inner circumferential surface of the boss and the outer circumferential surface of the cylindrical shaft portion of the shoulder bolt.

Even if the boss 130 is brought into contact with the wall of engine E as shown in FIG. 3, or into contact with the flange Sf of the shoulder bolt SB as shown in FIG. 4, engine oil from both sides of the lever body 120 is reliably guided by the oil guide grooves 131 to region 132, so that the engine oil penetrates the region 132 thoroughly, without uneven distribution, and serves as lubricating oil for the lever.

Because the oil guide groove 131 is formed in a funnel shape, tapering down from the outer circumferential surface to the inner circumferential surface of the boss 130, even when only a mist of engine oil is present, the mist is reliably caught, collected, and liquefied, and the liquefied oil flows reliably to the region 132. The tapered oil guiding groove also more effectively collects and combines small amounts of oil adhering to the lever.

As shown in FIG. 2, and oil guide wall 121 is continuous with the outer circumferential surface of the boss, meeting the boss at a location adjacent one of the oil guiding grooves 131. A similar oil guide wall is provided on the opposite side of the web of the lever body, meeting the outer circumferential surface of the boss adjacent the location of the other oil guiding groove 131. These oil guide walls ensure that engine oil adhering to the surface of the lever body 120 can flow smoothly and efficiently flow into the oil guide grooves 131. As seen in FIGS. 3 and 4, the oil guide walls can extend outward beyond the inner walls of the grooves so that some of the oil flowing down the guide walls can flow directly into the grooves 131.

Reinforcing ribs are preferably formed on both sides of the web of the lever body, and one such reinforcing rib, 122 is shown in FIG. 2. These reinforcing ribs improve the strength and endurance of the lever strength, and are preferably molded as a unit with the web of the lever body. An opening 123, serving as an oil communicating path, is provided at one end of rib 122, and similar oil communicating paths (not shown in FIG. 2) are formed in the other ribs. These oil communicating paths provide for smooth flow of oil past the ribs toward the boss, and increase the efficiency of the flow of oil to the oil guide grooves 131.

The reinforcing are preferably oblique with respect to the vertical direction, with the openings (e.g., opening 123) at the lower ends of the ribs, so that oil can flow downward along a ribs and then downward through the opening at the lowermost end of the rib.

Figure 5A:
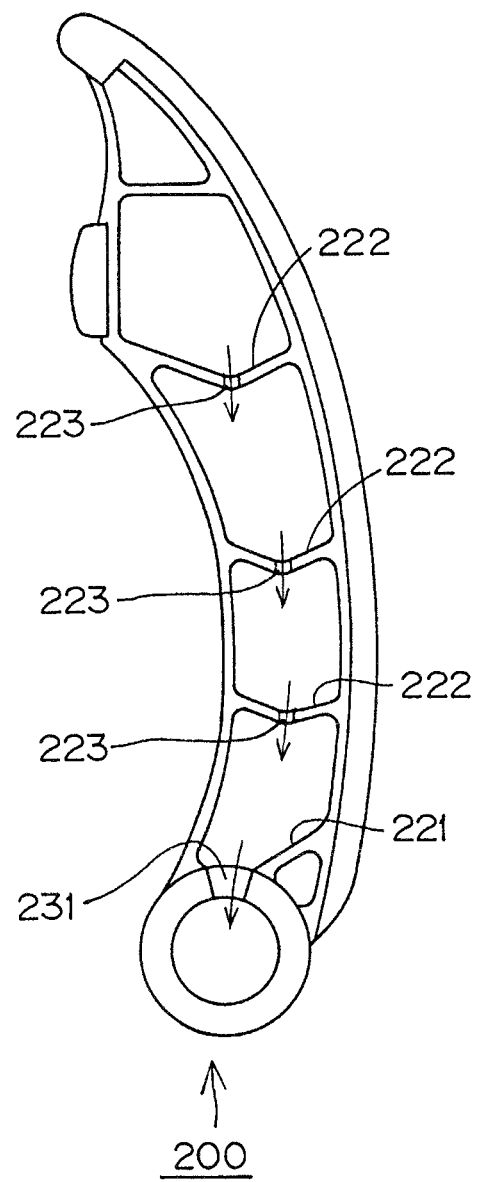
FIGS. 5(a), 5(b) and 5(c) are elevational views showing three modified examples of tensioner levers according to the invention.
Figure 5B:
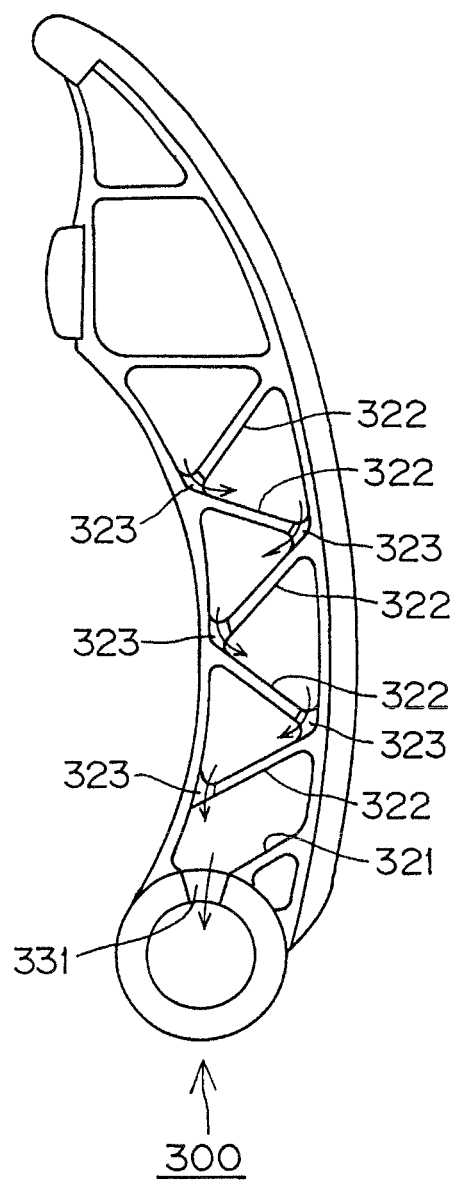
Figure 5C:
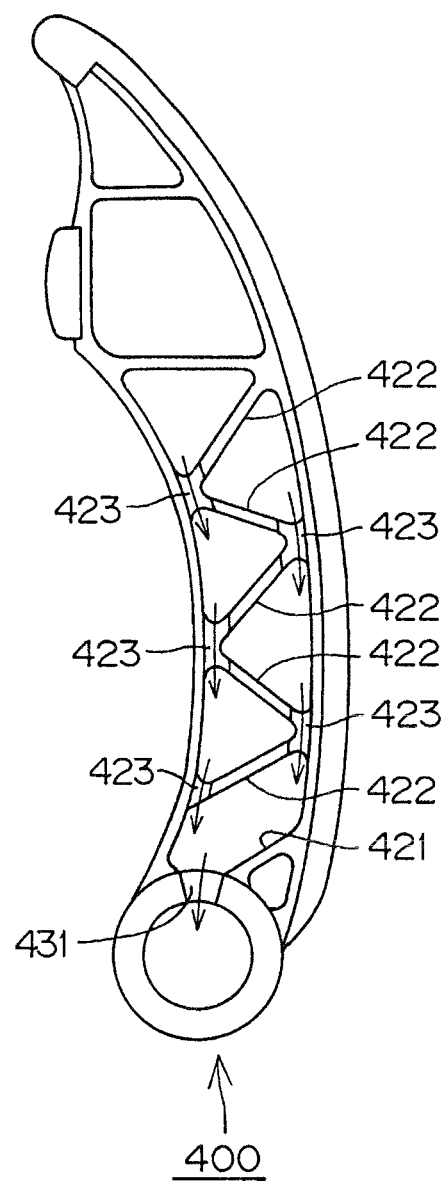
Figure 6:
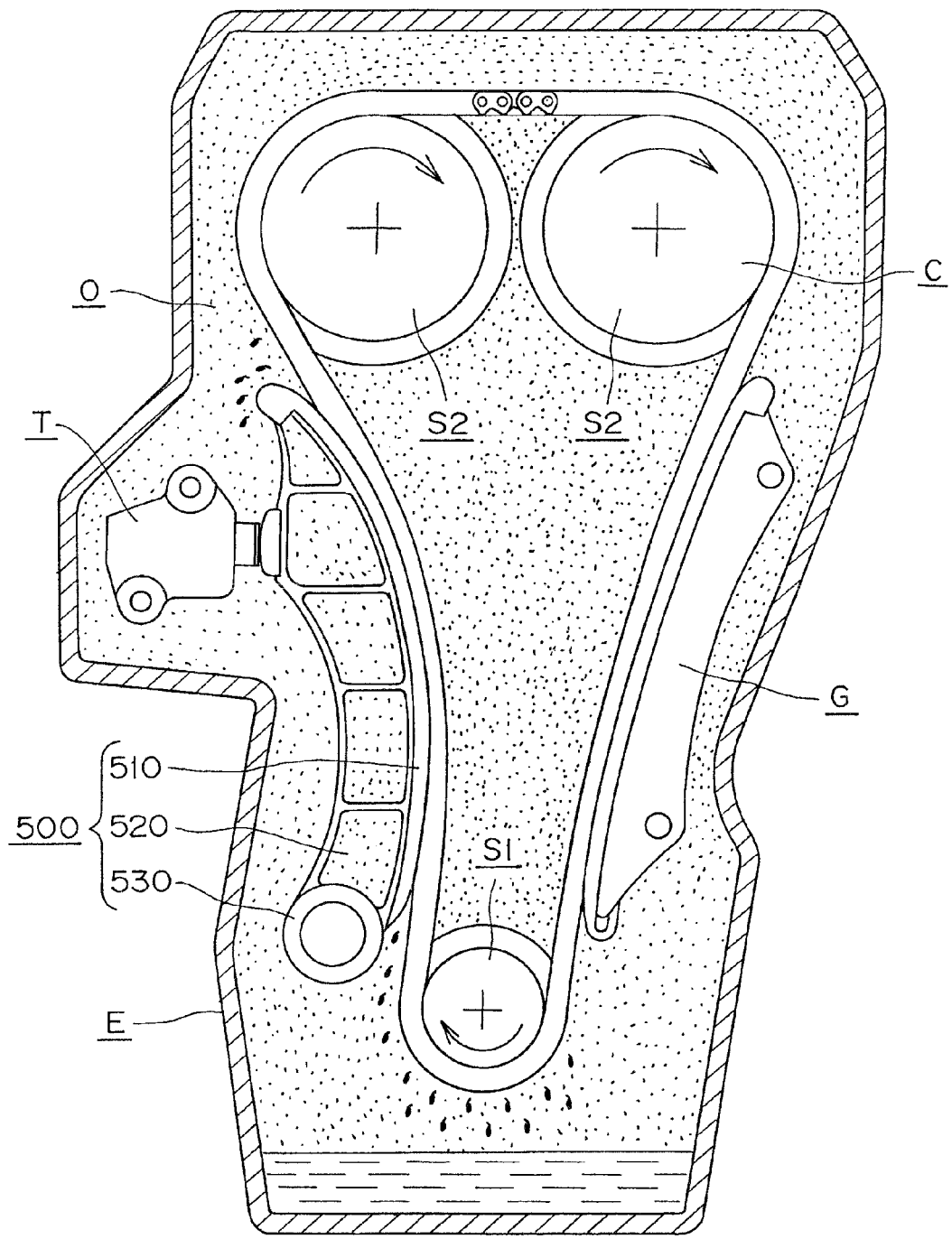
FIG. 6 is an elevational view of an engine timing transmission incorporating a conventional tensioner lever.
Figure 7:
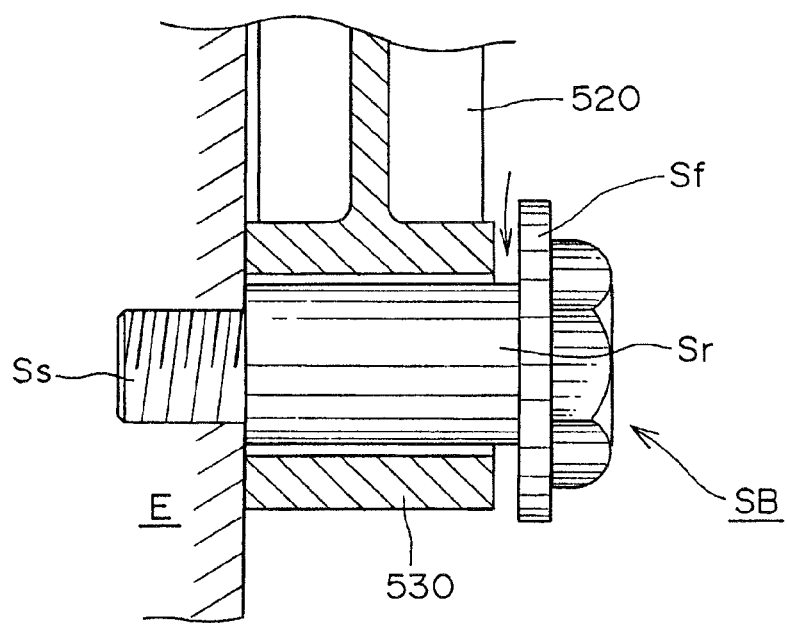
FIG. 7 is a cross-sectional view of a part of the conventional tensioner lever of FIG. 6, showing the pivoting boss portion of the lever in direct contact with a wall of an engine.
Figure 8:
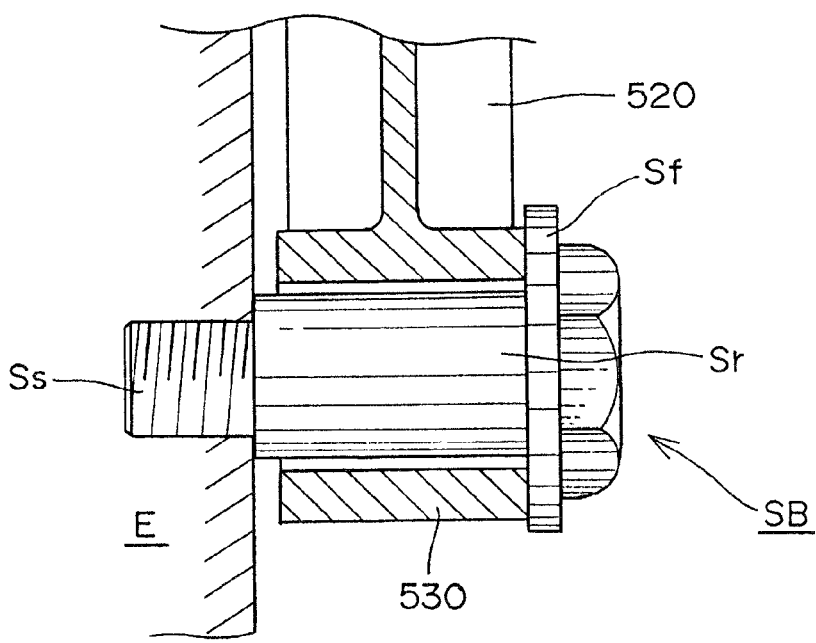
FIG. 8 is a cross-sectional view of a part of the tensioner lever of FIG. 6, showing the pivoting boss portion of the lever in direct contact with the flange portion of a shoulder bolt on which the lever is pivoted.

FIGS. 5(a), 5(b) and 5(c) show modified versions of the tensioner lever. In lever 200 of FIG. 5(a), the ribs 222 are opposed, downwardly sloping ribs forming V-shaped structures, and oil passages 223 are central openings located at the lowermost portions of the ribs. These openings allow oil to flow toward a sloping guide wall 221, which leads to funnel-shaped groove 231. In FIG. 5(b), lever 300, is provided with a zig-zag arrangement of reinforcing ribs 322, each having at its lower end an opening 323. Here, as in FIG. 5(a), the openings allow oil to flow toward the funnel-shaped groove 331 or toward a sloping guide wall 321, which leads to funnel-shaped groove 331. In FIG. 5(c), reinforcing ribs 422 are disposed in a zig-zag arrangement, with openings 423 extending through the ends of both of a pair of ribs, where the ribs meet. Here again, the openings allow oil to flow toward the funnel-shaped groove 431, or to a sloping guide wall 421, which leads to the funnel-shaped groove 431.

In the tensioner lever of the invention, an oil guide groove, which is preferably funnel-shaped, guides engine oil which adheres to the lever body toward region between the inner wall of the lever's pivoting boss and the shaft portion of the mounting bolt on which the lever is pivoted. The oil guide groove extends from the outer circumferential surface of the boss to its inner circumferential surface, and preferably, oil-guiding grooves are formed at both ends of the boss. Thus, with the lever extending upward from its pivot location, even if the boss is in contact with the wall of an engine or with the flange of the shoulder bolt on which the lever is mounted, engine oil adhering to the lever body can flow from both ends of the boss into the region between the inner wall of the hole in the boss and the outer circumferential surface of the shaft extending through the hole in the boss, thereby penetrating that region thoroughly. The engine oil can then be utilized effectively as lubricating oil for the lever, so that galling, seizing, asymmetric wear, and friction loss are suppressed and superior endurance can be exhibited. The lever can follow changes in tension in the chain smoothly, and, in cooperation with a tensioner, maintain appropriate tension in the chain. Furthermore, with oil communicating paths formed in oblique ribs integrally molded as parts of the lever body and at lowermost portions of the oblique ribs, the engine oil adhering to the entire surface of the lever body can smoothly toward and into the pivoting boss without being blocked by the ribs. Thus, adhering to the entire surface of the lever body can be guided to the oil guiding groove or grooves in the lever's pivoting boss, and utilized efficiently for lubrication of the lever.

We claim:

1. In combination with an engine having a traveling transmission chain, a tensioner lever comprising an elongated lever body having front and back sides, and two opposite lateral sides, and an elongated shoe having a back side supported by the front side of the lever body and a front surface for sliding contact with the transmission chain, the chain being arranged to travel along the direction of elongation of the shoe from a first end thereof toward an opposite end thereof, a boss formed on the lever body adjacent the first end of the shoe, the boss having a through hole for receiving a shaft portion of a shoulder bolt and having opposite ends spaced from each other along the direction of said through hole, said through hole having an inner surface, a shoulder bolt mounted on said engine, and having a shaft portion extending through the boss of the lever body, the shaft portion extending from a surface of the engine to a shoulder of the shoulder bolt, and each of said opposite ends of the boss being capable of contacting one of said surface of the engine and said shoulder to limit axial movement of the boss on the shaft portion, the boss having an inner circumferential surface and an outer circumferential surface, and an oil guiding groove formed in the boss and extending from the inner circumferential surface to the outer circumferential surface in the direction from the first end of the shoe toward the opposite end thereof, for guiding engine oil adhering to the lever body to a region between the shaft portion of the shoulder bolt and the inner surface of the through hole, at least part of said oil guiding groove extending through the boss at a location between said opposite ends thereof and closer to said one of said opposite ends of the boss than to the other of said opposite ends of the boss.

2. A tensioner lever according to claim 1, in which the boss formed on the lever body has a first portion extending from one lateral side of the lever body, said groove being formed in said first portion, and a second portion extending from the other lateral side of the lever body, and having a second oil guiding groove formed in said second portion, and extending through said second portion from the outer circumferential surface to the inner circumferential surface of the boss, for guiding engine oil adhering to the lever body to a region between the shaft portion of the shoulder bolt and a portion of the inner surface of the through hole.

3. A tensioner lever according to claim 2, in which each of said oil guiding grooves has a tapered funnel shape, each said groove being circumferentially wider at the outer circumferential surface of the boss and circumferentially narrower at the inner circumferential surface of the boss.

4. A tensioner lever according to claim 2, in which each of said oil guiding grooves has a tapered funnel shape, each said groove being circumferentially wider at the outer circumferential surface of the boss and circumferentially narrower at the inner circumferential surface of the boss, and in which the lever body is formed with an oil guiding wall continuous with the outer circumferential surface of the boss and extending from the location of the oil guiding groove, for carrying engine oil adhering to the lever body into the oil guide groove.

5. A tensioner lever according to claim 2, in which each of said oil guiding grooves has a tapered funnel shape, each said groove being circumferentially wider at the outer circumferential surface of the boss and circumferentially narrower at the inner circumferential surface of the boss; in which the lever body is formed with an oil guiding wall continuous with the outer circumferential surface of the boss and extending from the location of the oil guiding groove, for carrying engine oil adhering to the lever body into the oil guide groove; and in which the lever body has at least one integrally molded reinforcing rib, and in which said rib has an opening forming an oil communicating path allowing engine oil adhering to the lever body to flow past said reinforcing rib toward said boss.

6. A tensioner lever according to claim 5, in which said reinforcing rib is disposed obliquely in a direction such that engine oil adhering to the rib flows downward by gravity toward said oil communicating path.

7. A tensioner lever according to claim 5, in which at least part of said reinforcing rib is disposed obliquely in a direction such that engine oil adhering to the oblique part of the rib flows downward by gravity toward said oil communicating path.

8. A tensioner lever according to claim 1, in which said oil guiding groove has a tapered funnel shape, the groove being circumferentially wider at the outer circumferential surface of the boss and circumferentially narrower at the inner circumferential surface of the boss.

9. A tensioner lever according to claim 1, in which the lever body is formed with an oil guiding wall continuous with the outer circumferential surface of the boss and extending from the location of the oil guiding groove, for carrying engine oil adhering to the lever body into the oil guide groove.

10. A tensioner lever according to claim 1, in which the lever body has at least one integrally molded reinforcing rib, and in which said rib has an opening forming an oil communicating path allowing engine oil adhering to the lever body to flow past said reinforcing rib toward said boss.

11. A tensioner lever according to claim 10, in which said reinforcing rib is disposed obliquely in a direction such that engine oil adhering to the rib flows downward by gravity toward said oil communicating path.

12. A tensioner lever according to claim 10, in which at least part of said reinforcing rib is disposed obliquely in a direction such that engine oil adhering to the oblique part of the rib flows downward by gravity toward said oil communicating path.

* * * * *